United States Patent

Hutchins

[15] 3,646,736
[45] Mar. 7, 1972

[54] ATTACHMENT FOR A RIDING-TYPE LAWNMOWER

[72] Inventor: Frank B. Hutchins, 67 Pinedale Road, Asheville, N.C. 28805

[22] Filed: Jan. 6, 1970

[21] Appl. No.: 944

[52] U.S. Cl. ............................56/16.9, 56/255, 56/DIG. 22
[51] Int. Cl. ............................................A01d 35/26
[58] Field of Search............56/25.4, 255, 27, 25, DIG. 21, 56/DIG. 22, 16.9

[56] References Cited

UNITED STATES PATENTS

| 1,049,190 | 12/1912 | Anderson | 56/25 |
| 2,751,741 | 6/1956 | Carson | 56/27 |
| 3,059,397 | 10/1962 | Anderson et al. | 56/25.4 |
| 3,084,495 | 4/1963 | Blackerby | 56/255 |

*Primary Examiner*—Louis G. Mancene
*Assistant Examiner*—D. L. Weinhold
*Attorney*—Berman, Davidson and Berman

[57] ABSTRACT

A riding lawnmower provided with a wheeled pivoted forward extension carrying a transverse depending rake assembly and a freely suspended transverse magnet bar assembly spaced behind the rake assembly. The extension has a slotted pivoted lever which can be interlocked with another lever pivoted to the lawnmower to at time support the extension in an elevated inoperative position.

8 Claims, 3 Drawing Figures

PATENTED MAR 7 1972 3,646,736
FIG. 1.
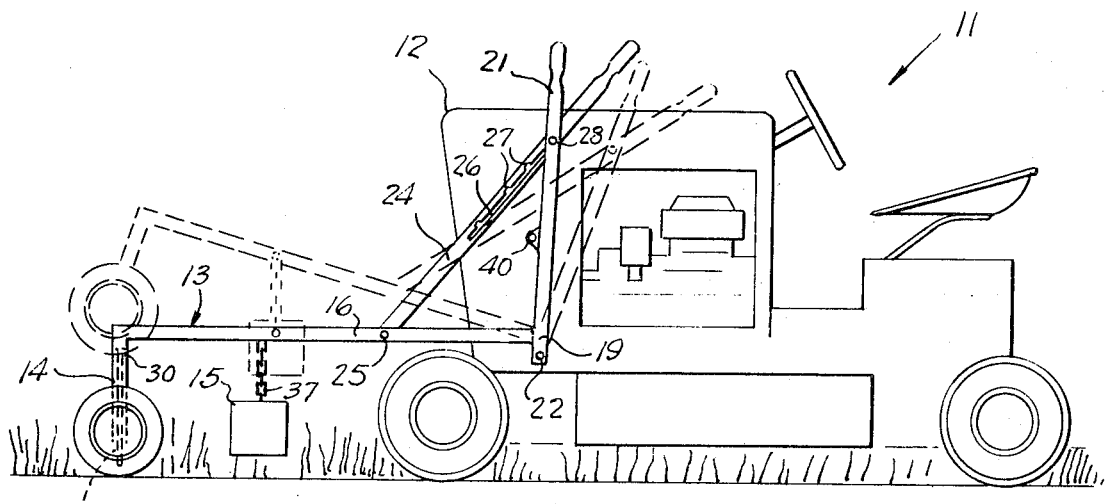
FIG. 2.
FIG. 3.
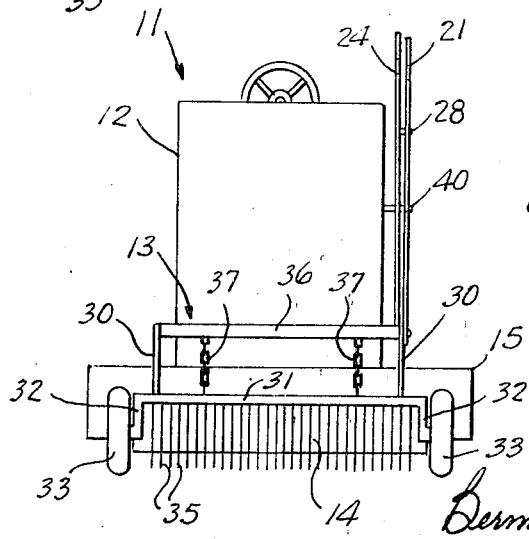
INVENTOR
FRANK B. HUTCHINS,
BY
Berman, Davidson & Berman, ATTORNEYS

ATTACHMENT FOR A RIDING-TYPE LAWNMOWER

This invention relates to lawnmowers, more particularly to power lawnmowers of the riding type and rake and magnet attachments for such riding-type lawnmowers.

A main object of the invention is to provide a novel and improved lawnmower of the riding type provided with a forward rake and magnet attachment, the attachment being relatively simple in construction, being easy to install, and being arranged so that it can be readily raised or lowered by the operator of the lawnmower, as desired.

A further object of the invention is to provide an improved magnet and rake attachment for a riding-type power lawnmower, the attachment involving inexpensive parts, being durable in construction, being easy to operate, and substantially improving the efficiency of the power lawnmower associated therewith.

Further objects and advantages of the invention will become apparent from the following description and claims, and from the accompanying drawing, wherein:

FIG. 1 is a side elevational view of an improved riding-type power lawnmower provided with a rake and magnet attachment in accordance with the present invention.

FIG. 2 is a top plan view of the power lawnmower of FIG. 1.

FIG. 3 is a front-end elevational view of the power lawnmower of FIGS. 1 and 2.

Referring to the drawings, 11 generally designates a riding lawnmower constructed in accordance with the present invention, shown with its rake and magnet attachment in lowered operating position.

The lawnmower 11 comprises a riding lawnmower 12 of generally conventional construction except that it is provided with a pivoted forwardly extending frame, designated generally at 13 which has a transversely extending rake assembly 14 at its forward end and a freely suspended transverse magnet bar assembly 15 at its intermediate portion. The frame 13 comprises a pair of longitudinally extending side bars 16, 16 having intermediate offset portions 17, 17, the side bars being respectively pivotally and rigidly connected at their rear ends, as shown at 18 and 19, to a side 20 of the body of the lawnmower 12 and to an upstanding lever 21, which in turn is pivotally connected at its bottom end, as shown at 22 to the opposite side of the body of lawnmower 12. The distance between the connections 19 and 22 is very short, so that in effect the frame 13 is pivoted to the forward portion of the conventional lawnmower 12, since the frame can freely swing upwardly from the horizontal position thereof shown in FIG. - to the dotted view position thereof because of the pivoting allowed at the respective pivotal connections of the side bars 16.

Pivoting of the frame 13 is controlled by the provision of a second lever 24 which is pivoted at 25 to the side bar 16 which is provided with the rigid connection 19 to lever 21. The lever 24 is provided with a longitudinal slot 26 having spaced notches 27, and the lever 21 is pivotally and slidably connected to the lever 24 by a transverse pin 28 extending through an aperture in lever 21 and through the slot 26, the in 28 being lockingly engageable in a selected notch 27 to lock lever 24 and frame 13 in a desired position, for example, in the elevated dotted view position thereof shown in FIG. 1.

The side bars 16, 16 are provided at their forward ends with depending vertical arms 30, 30 and rigidly secured to the bottom ends of the arms 30, 30, is the transversely extending bar 31 which projects outwardly beyond the arms 30, 30 and which is in turn provided with depending vertical arms 32, 32 to which are journaled respective ground-engaging supporting wheels 33, 33. Secured to the bar 31 are a plurality of uniformly spaced depending vertical rake teeth 35 which extend almost to ground level, with the frame 13 in its horizontal lowered position, supported on wheels 33, 33, as shown in FIG. 3.

Secured between the side bars 16, 16 forwardly adjacent the intermediate offsets 17, 17 is a crossbar 36, and suspended from said crossbar by chains 37, 37 is the transversely extending magnet bar assembly 15, which is thereby supported beneath the intermediate portion of the frame 13, spaced behind the rake assembly defined by bar 31 and rake teeth 35. Thus, bar 31 and rake teeth 35 define the above-mentioned rake assembly 14.

As shown in FIG. 3, the magnet assembly 15 depends adjacent to the ground, being spaced a short distance above the ground in a position to pick up objects of magnetic material such as nails or scraps of sheet metal, tin cans, or other debris which may be encountered ahead of the cutting blade portions of the lawnmower 12.

The magnet bar assembly 15 is of generally conventional construction, and may comprise a built-up permanently magnetized structure including bar magnets and necessary supports therefor, fabricated to define an elongated body which can be suspended by the chains 37, 37 from the crossbar 36 in the manner shown.

As shown in FIG. 1, when the rake and magnet frame 13 is in its lowered horizontal operative position with the wheels 33, 33 engaged in the ground, the pin 28 is in the upper portion of the slot 26, the lever 21 is substantially vertical and the cooperating lever 24 is inclined downwardly and forwardly at an angle of approximately 45°. Under these conditions, the rake assembly 14 and the magnet assembly 15 are supported in proximity to the ground, and as the riding lawnmower moves forwardly the rake teeth 35 straighten up the blades of grass as it passes over such blades and erects them so that they can be easily cut by the rotating blade of the lawn mower. The magnet assembly 15 which is located immediately behind the rake assembly 14 catches loose nails and other magnetic objects, such as tin cans, or the like, and carries such objects, removing them from the ground so that they cannot be engaged by the rotating blades of the lawnmower 12. This allows safe and the efficient cutting action as the lawnmower progresses over the area to be mowed, and the rider can thus guide the machine smoothly and efficiently. After the mowing operation, or when the lawnmower is to be moved to another location for storage, or the like, the frame 13 may be elevated to an inoperative position, for example, to the dotted view position thereof shown in FIG. 1 by pulling the top handle portion of lever 21 with one hand and holding the top handle portion of the lever 24 with the other hand, causing the lever 21 to be moved rearwardly with the pin 28 sliding in the slot 26. When the frame 13 has been elevated to the desired inoperative position, it can be locked in said position by allowing the lever 24 to descent slightly to engage pin 28 in a selected notch 27, thereby locking lever 24 in a position such as that shown in dotted view in FIG. 1, for example, inclined downwardly and forwardly at an angle of approximately 30°, whereby the frame 13 is held in its elevated inoperative position.

When it is desired to lower the frame 13, it is merely necessary to push upward slightly on the handle end of lever 24, causing the pin 28 to be released from its retaining notch 27, whereby the frame 13 may be lowered towards working position with the pin 28 sliding the slot 26.

As will be readily apparent, the use of the ground-engaging wheels 33, 33 is not essential, since the frame 13 may be supported in a horizontal working position, if so desired, merely by engaging the pin 28 in a suitable notch 27 provided at the upper portion of the slot 26, or by allowing the pin 28 to abut the upper end of slot 26. Under these conditions, it would be merely necessary to provide a suitable abutment, such as a stop pin on the side of the mower body 12 against which the lever 21 is engageable to limit its counterclockwise rotation. Such a pin is shown, for example, at 40 in FIG. 1.

While a specific embodiment of an improved riding lawnmower provided with a rake and magnet attachment has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a wheeled power lawnmower having a rider's seat, a forwardly extending frame pivoted to the lawnmower on a transverse axis, said frame including a pair of side bars having depending vertical arms at their forward ends, a transversely extending bar rigidly secured to the bottom ends of said depending arms, said bar having depending vertical arms spaced outwardly from said first-named depending vertical arms, respective ground-engaging supporting wheels journaled to the bottom ends of said last-named depending vertical arms, a plurality of uniformly spaced depending vertical rake teeth extending substantially to ground level secured to said transversely extending bar and substantially covering the area between said last-named depending vertical arms and being substantially coplanar with the axis of said supporting wheels, said frame side bars having inwardly offset rear portions, a crossbar secured to said side bars forwardly adjacent said inwardly offset rear portions and spaced a substantial distance rearwardly of said rake teeth, and a transverse bar magnet assembly freely suspended from said crossbar and depending adjacent to ground level.

2. The lawnmower combination of claim 1 and cooperating frame-lifting means operatively connected between said lawnmower and said frame means.

3. The lawnmower combination of claim 2 and wherein said frame-lifting means comprises a pair of interconnected levers, one of said levers being pivotally connected to the lawnmower and the other lever being pivotally connected to one of said side bars.

4. The lawnmower combination of claim 3 and wherein said other lever is pivotally connected to said one of the side bars at a location spaced a substantial distance from the pivotal connection of said one of the levers to the lawnmower.

5. The lawnmower combination of claim 4 and wherein one of the levers is formed with a longitudinal slot having a locking notch, the other lever extending adjacent said slot, and a transverse pin connecting said levers and slidably engaged in said slot, said locking notch being located to at times receive said transverse pin to lock the frame means in an elevated inoperative position.

6. The lawnmower combination of claim 5 and wherein said longitudinal slot is provided with a plurality of spaced locking notches, whereby said frame means may be selectively locked in any one of a plurality of elevated inoperative positions.

7. The lawnmower combination of claim 3 and wherein said one of the levers is in a substantially upstanding vertical position and the other lever is inclined at a substantial angle to the vertical when said frame means is in a lowered operating position.

8. The lawnmower combination of claim 7 and wherein one of the levers is formed with a longitudinal slot having a locking notch, the other lever extending adjacent said slot, and a transverse pin connecting said levers and slidably engaged in said slot, said locking notch being located to at times receive said transverse pin to lock the frame means in an elevated inoperative position, wherein said other lever is inclined at an angle of approximately 45° to the vertical when said frame means is in a lowered operating position.

* * * * *